(12) United States Patent
Sun et al.

(10) Patent No.: US 11,987,039 B2
(45) Date of Patent: May 21, 2024

(54) WIDE LOW-TEMPERATURE IMPACT-RESISTANT AND BENDING-RESISTANT PVC FOAM CO-EXTRUDED SHEET AND PREPARATION METHOD THEREOF

(71) Applicant: BODO PLASTICS CO., LTD., Zibo (CN)

(72) Inventors: Feng Sun, Zibo (CN); Jian Ma, Zibo (CN); Wei Miao, Zibo (CN); Zhonglin Zhang, Zibo (CN); Guoqing Yang, Zibo (CN); Changming Wang, Zibo (CN)

(73) Assignee: BODO PLASTICS CO., LTD., Zibo (CN)

( * ) Notice: Subject to any disclaimer, the term of this patent is extended or adjusted under 35 U.S.C. 154(b) by 0 days.

(21) Appl. No.: 18/502,415

(22) Filed: Nov. 6, 2023

(65) Prior Publication Data
US 2024/0075705 A1 Mar. 7, 2024

Related U.S. Application Data

(63) Continuation of application No. PCT/CN2022/123547, filed on Sep. 30, 2022.

(30) Foreign Application Priority Data

Sep. 1, 2022 (CN) .......................... 202211067815.2

(51) Int. Cl.
*B32B 5/32* (2006.01)
*B32B 5/18* (2006.01)

(52) U.S. Cl.
CPC ................ *B32B 5/32* (2013.01); *B32B 5/18* (2013.01); *B32B 2250/22* (2013.01); *B32B 2264/104* (2013.01); *B32B 2266/0235* (2013.01); *B32B 2307/4026* (2013.01); *B32B 2307/546* (2013.01); *B32B 2307/558* (2013.01); *B32B 2307/7145* (2013.01); *B32B 2419/00* (2013.01)

(58) Field of Classification Search
CPC ......... B32B 5/32; B32B 5/18; B32B 2250/22; B32B 2264/104; B32B 2266/0235; B32B 2307/4026; B32B 2307/546; B32B 2307/558; B32B 2307/7145; B32B 2419/00
See application file for complete search history.

(56) References Cited

FOREIGN PATENT DOCUMENTS

| CN | 109627626 A | 4/2019 |
|---|---|---|
| CN | 110452341 A | 11/2019 |
| CN | 113527824 A | 10/2021 |

*Primary Examiner* — Hai Vo
(74) *Attorney, Agent, or Firm* — Nitin Kaushik

(57) ABSTRACT

The present disclosure belongs to the technical field of PVC foam co-extruded sheets, and particularly relates to a wide low-temperature impact-resistant and bending-resistant PVC foam co-extruded sheet and a preparation method thereof. The PVC foam co-extruded sheet of the present disclosure includes a core layer and a skin layer. Raw materials of the core layer include PVC resin powder, a silicone-methyl methacrylate-ethyl acrylate composite low-temperature toughening and reinforcing agent, a filler, a foaming regulator I, a white foaming agent, a calcium-zinc stabilizer, a cold-resistant plasticizer, stearic acid, polyethylene wax, and oxidized polyethylene wax. Raw materials of the skin layer include PVC resin powder, a silicone-methyl methacrylate-ethyl acrylate composite low-temperature toughening and reinforcing agent, activated nano-silica, a foaming regulator II, a composite foaming agent, a calcium-zinc stabilizer, a composite weather-resistant modifier, rutile titanium dioxide, polyethylene wax, oxidized polyethylene wax, a cold-resistant plasticizer, and a compound antibacterial and mildewproof agent.

6 Claims, No Drawings

WIDE LOW-TEMPERATURE IMPACT-RESISTANT AND BENDING-RESISTANT PVC FOAM CO-EXTRUDED SHEET AND PREPARATION METHOD THEREOF

CROSS-REFERENCE TO RELATED APPLICATIONS

The application claims priority to Chinese patent application No. 202211067815.2, filed on Sep. 1, 2022, the entire contents of which are incorporated herein by reference.

TECHNICAL FIELD

The present disclosure belongs to the technical field of PVC foam co-extruded sheets, and particularly relates to a wide low-temperature impact-resistant and bending-resistant PVC foam co-extruded sheet and a preparation method thereof.

BACKGROUND

The existing similar PVC foam decorative co-extruded sheets, generally during processing, have good longitudinal bending resistance and poor transverse bending resistance. The transverse bending is easy to break, resulting in material waste. In addition, the bending-resistant layer may break when falling or being impacted by external forces during processing. According to the use environment of a product, especially in winter or low-temperature environments, when most of the similar PVC foam decorative co-extruded sheets are subjected to external forces or impact with different degrees, a brittle fracture will occur in the bending part, which will seriously affect the application field and use scenario of the product.

The widths of the existing co-extruded bending-resistant PVC sheets are generally below 1220 mm, which can not adapt to the application in large wide product scenarios. The co-extruded products on the market have poor wear resistance, and their surfaces are easy to scratch during use. When exposed to light for a long time, the surface tends to turn yellow, which affects a decorative effect.

Disclosed in the patent No. CN109591419A is a PVC foam bending-resistant sheet and a preparation method thereof. A special bending-resistant and toughening agent used in a surface layer is a high molecular weight acrylate-chlorinated polyethylene graft polymer, which can be added up to 11-20 parts as a high molecular weight organic elastomer. The core layer is added with soybean oil, and its bending resistance is acceptable at room temperature, but its Vicat softening point is about 60 degrees Celsius. When facing a closed high-temperature space or intense sunlight exposure, the dimensional stability would be significantly decreased, and the core layer would be easily affected by temperature to cause thermal deformation and warping, causing the bending layer to crack due to deformation.

In addition, the addition of a large amount of high molecular weight acrylate-chlorinated polyethylene graft polymer in the skin layer increases the toughness and decreases significantly the surface rigidity and tensile strength. The production process of this patent uses a three-roller cooling shaping and does not use a shaping sheet water-cooling shaping. In conclusion, the hardness and rigidity of the product surface will be greatly affected. During processing and daily use, the surface is knocked or impacted by external forces, which may cause pits and scratches on the surface, thus affecting the aesthetics and product value.

In addition, the toughening agent used in the skin layer is a conventional copolymer of acrylate and chlorinated polyethylene, which can not withstand low-temperature impact. In winter or low-temperature conditions, its bending performance will be significantly decreased, resulting in the brittleness of the skin layer and thus breaking.

SUMMARY

An object of the present disclosure is to provide a wide low-temperature impact-resistant and bending-resistant polyvinyl chloride (PVC) foam co-extruded sheet. The PVC foam co-extruded sheet has excellent transverse and longitudinal bending resistance in the upper skin layer and the lower skin layer in both high-temperature and low-temperature environments, and also has excellent antibacterial and mouldproof properties and wear resistance. The present disclosure further provides a preparation method for the PVC foam co-extruded sheet.

The wide low-temperature impact-resistant and bending-resistant PVC foam co-extruded sheet of the present disclosure comprises a core layer and a skin layer, the core layer comprising the following raw materials in parts by weight:

| | |
|---|---|
| PVC resin powder | 50-80 parts |
| silicon-acrylic composite low-temperature toughening and reinforcing agent | 3-6 parts |
| filler | 10-25 parts |
| foaming regulator I | 5-15 parts |
| white foaming agent | 1-4 parts |
| calcium-zinc stabilizer | 3-6 parts |
| cold-resistant plasticizer | 3-6 parts |
| stearic acid | 0.1-0.5 part |
| polyethylene wax | 0.2-1.1 parts |
| oxidized polyethylene wax | 0.2-0.8 part; | the skin layer comprising the following raw materials in parts by weight:

| | |
|---|---|
| PVC resin powder | 60-100 parts |
| silicon-acrylic composite low-temperature toughening and reinforcing agent | 5-9 parts |
| activated nano-silica | 1-3 parts |
| foaming regulator II | 2-5 parts |
| composite foaming agent | 0.3-1.2 parts |
| calcium-zinc stabilizer | 4-5 parts |
| composite weather-resistant modifier | 2-5 parts |
| rutile titanium dioxide | 3-8 parts |
| polyethylene wax | 0.2-1.1 parts |
| oxidized polyethylene wax | 0.2-0.5 part |
| cold-resistant plasticizer | 2-4 parts |
| compound antibacterial and mildewproof agent | 0.5-1.5 parts. |

Among others,
  the skin layer comprises an upper skin layer and a lower skin layer, and an upper surface and a lower surface of the core layer are connected to the upper skin layer and the lower skin layer, respectively; the upper skin layer and the lower skin layer have a same raw material composition and dosage relationship.

The PVC resin powder in the core layer and the PVC resin powder in the skin layer are suspension grade-8 (SG-8) type PVC resin powder.

The silicone-methyl methacrylate-ethyl acrylate composite low-temperature toughening and reinforcing agents added in the core layer and the skin layer are terpolymers of silicone emulsion, ethyl acrylate and methyl methacrylate, which are modified and synthesized by chemical grafting and blending process.

The silicone-methyl methacrylate-ethyl acrylate composite low-temperature toughening and reinforcing agent comprises the following raw materials in percentage by mass: 55-85% of silicone emulsion, 5-15% of ethyl acrylate, and 10-30% of methyl methacrylate.

Ethyl acrylate (soft monomer) is chemically grafted with silicone emulsion. The modified polymer is then blended with methyl methacrylate (MMA, hard monomer), physically modified, and finally dried and pelletized to form the silicone-methyl methacrylate-ethyl acrylate composite low-temperature toughening and reinforcing agent.

A method for preparing the silicone-methyl methacrylate-ethyl acrylate composite low-temperature toughening and reinforcing agent comprises the following steps:
(1) adding 70% by mass of water and sodium dodecyl benzene sulfonate to a reaction kettle, stirring and reacting at 55° C. for 1.5 h to obtain a first mixture;
(2) adding methyl triethoxysilane and the remaining water to a reaction kettle for stirring, with a stirring speed of 500 r/min; and then warming to 60° C. and adjusting the stirring speed to 3000 r/min, adding the mixture prepared in step (1), and continuing the reaction for 5 h after the completion of the dropwise addition to obtain the silicone emulsion;
(3) mixing ethyl acrylate and methyl methacrylate evenly according to a mass ratio, and then adding benzoyl peroxide to dissolve the mixture and obtain a second mixture; and
(4) simultaneously dropping the silicone emulsion prepared in step (2) and the second mixture prepared in step (3) into n-butanol for 4 h, thereafter adjusting a pH of the solution to 7, then stirring and reacting for 4.5-5 h with the temperature maintained at 100-105° C. to form a salt by neutralization, drying and pelletizing to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The silicone-methyl methacrylate-ethyl acrylate composite low-temperature toughening and reinforcing agent can significantly improve the low-temperature impact strength of the PVC matrix, while the tensile strength, elastic modulus and rigidity of the PVC matrix can be effectively maintained and improved. The addition to the PVC matrix does not lower the Vicat softening point and thermal deformation temperature of the product as a whole, and the product does not soften, deform and warp in high-temperature environments.

The filler in the core layer is heavy calcium carbonate.

The foaming regulator I is a compound of Model 92 produced by Nikko Chemical, Model HL-801 produced by Nippon Chemical and Model HL-175 produced by Nippon Chemical in a mass ratio of 1.5:2:0.5.

Model 92 produced by Nikko Chemical is synthesized with high viscosity methyl methacrylate and butyl methacrylate, and has a viscosity of 13.98-15.24 η; Model HL-801 produced by Nikko Chemical is synthesized with styrene and acrylonitrile, and has a viscosity of 11.65-13.39 η; and Model HL-175 produced by Nippon Chemical is synthesized with styrene and acrylonitrile, and has a viscosity of 1.32-1.89η.

The use of Model 92 produced by Nikko Chemical, Model HL-801 produced by Nippon Chemical and Model HL-175 produced by Nippon Chemical for compounding the foaming modifier I can effectively improve the plasticizing and melt strength of PVC, significantly improve the melt fluidity of the PVC matrix after foaming, and also can effectively solve the color difference problem of PVC foaming melt on both sides and in the middle due to different residence times in a wide die; at the same time, the problem that the skin layers cannot be completely wrapped the two sides of the wide product due to poor flowability is improved.

The main function of the foaming regulator I is to increase the melt strength of the PVC matrix, so that foam porosities of PVC after foaming are uniform and dense, making them not easy to merge.

The white foaming agent in the core layer is sodium bicarbonate, preferably Model w3835 produced by Shanghai Jieshangjie.

The calcium-zinc stabilizer in the core layer and the calcium-zinc stabilizer in the skin layer are the same, both being Bear R502. The calcium-zinc stabilizer is synthesized by taking calcium salt, zinc salt, lubricant, antioxidant, etc. as main components and using special composite processes.

The cold-resistant plasticizer in the core layer and the cold-resistant plasticizer in the skin layer are the same, both being diisooctyl adipate (DOA).

Stearic acid, polyethylene wax and oxidized polyethylene wax are added as a lubricant in the core layer.

Oxidized polyvinyl chloride wax is preferably Model OS-25 produced by Weifang Kelan. Oxidized polyvinyl chloride wax has special performances such as low viscosity, high softening point, good hardness, etc., and non-toxicity, good thermal stability, low volatility at high temperatures, excellent dispersibility to fillers and pigments, excellent external lubricity, strong internal lubrication effect, and coupling effect, which can improve the production efficiency of plastic processing and reduce production costs.

The foaming regulator II is a compound of Model 92 produced by Nikko Chemical and Model HL-801 produced by Nippon Chemical in a mass ratio of 2:1.3.

Model 92 produced by Nikko Chemical is synthesized with high viscosity methyl methacrylate and butyl methacrylate, and has a viscosity of 13.98-15.24 η; Model HL-801 produced by Nikko Chemical is synthesized with styrene and acrylonitrile, and has a viscosity of 11.65-13.39η.

The composite foaming agent in the skin layer is a mixture of a white foaming agent and an AC foaming agent in a mass ratio of (1.31-1.52):(0.85-0.93); wherein the white foaming agent is sodium bicarbonate, which is Model w3835 produced by Shanghai Jieshangjie; the AC foaming agent is azodicarbonamide, which is ADC foaming agent produced by Ningxia Risheng.

The composite weather-resistant modifier in the skin layer is a mixture of an ultraviolet absorber and an antioxidant in a mass ratio of 1.5:2.5; wherein the ultraviolet absorber is 2-hydroxy-4-n-octoxybenzophenone, which is UV531 produced by Yantai Xinxiu Chemical. UV531 is light yellow needle crystal powder at room temperature and is a high-efficiency anti-aging additive with excellent performance. UV531 can strongly absorb 270-340 nm ultraviolet light and has characteristics such as light color, non-toxicity, good compatibility, small migration, and easy processing. The antioxidant is B215 produced by Tianjin Li'anlong, which is a binary compound series of phenolic antioxidants. B215 can be used at relatively high temperatures, has strong extraction resistance, and shows resistance to oxidative degradation during polymer processing.

The compound antibacterial and mildewproof agent in the skin layer is a compound of an infrared fluorescent agent and an inorganic silver ion antibacterial and mildewproof agent in a mass ratio of 0.0001:1; wherein the inorganic silver ion antibacterial and mildewproof agent is preferably AEM5700-1 produced by Guangdong Jianis; the infrared fluorescent agent is preferably the infrared green anti-counterfeiting powder produced by Qingdao Chongyu Technology Co. Ltd.

The method for preparing the wide low-temperature impact-resistant and bending-resistant PVC foam co-extruded sheet of the present disclosure comprises the following steps:
(1) preparing the silicone-methyl methacrylate-ethyl acrylate composite low-temperature toughening and reinforcing agent;
(2) placing the PVC resin powder, the silicone-methyl methacrylate-ethyl acrylate composite low-temperature toughening and reinforcing agent, the activated nanosilica and the calcium-zinc stabilizer in the raw materials of the skin layer into a high-speed hot mixing device according to a formula ratio for blending, then placing into a high-speed cold mixing machine for cold mixing, and finally placing into a storage tank for standby within 24-48 hours;
(3) placing the PVC resin powder, the silicone-methyl methacrylate-ethyl acrylate composite low-temperature toughening and reinforcing agent, the filler and the calcium-zinc stabilizer in the raw materials of the core layer into a high-speed hot mixing device according to a formula ratio for blending, then placing into a high-speed cold mixing machine for cold mixing, and finally placing into a storage tank for standby within 24-48 hours;
(4) adding other raw materials of the skin layer to the pretreated raw materials prepared in step (2) according to a raw materials ratio, and performing high-speed hot mixing and cold mixing; after completion, placing into a storage tank for standby;
(5) adding other raw materials of the core layer to the pretreated raw materials prepared in step (3) according to a raw material ratio, and performing high-speed hot mixing and cold mixing; after completion, placing into a storage tank for standby;
(6) plasticizing and extruding; and
(7) drawing and water-cooling shaping to obtain the wide low-temperature impact-resistant and bending-resistant PVC foam co-extruded sheet.

Among others,
a method for preparing the silicone-methyl methacrylate-ethyl acrylate composite low-temperature toughening and reinforcing agent in step (1) comprises the following steps:
(1) adding 70% by mass of water and sodium dodecyl benzene sulfonate to a reaction kettle, stirring and reacting at 55° C. for 1.5 h to obtain a first mixture;
(2) adding methyl triethoxysilane and the remaining water to a reaction kettle for stirring, with a stirring speed of 500 r/min; and then warming to 60° C. and adjusting the stirring speed to 3000 r/min, adding the mixture prepared in step (1), and continuing the reaction for 5 h after the completion of the dropwise addition to obtain the silicone emulsion;
(3) mixing ethyl acrylate and methyl methacrylate evenly according to a mass ratio, and then adding benzoyl peroxide to dissolve the mixture and obtain a second mixture; and
(4) simultaneously dropping the silicone emulsion prepared in step (2) and the second mixture prepared in step (3) into n-butanol for 4 h, thereafter adjusting a pH of the solution to 7, then stirring and reacting for 4.5-5 h with the temperature maintained at 100-105° C. to form a salt by neutralization, drying and pelletizing to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

For the blending in the high-speed hot mixing device in step (2), the mixing time is 25-40 minutes, and the high-speed hot mixing temperature is 100-105° C.; the cold mixing time is 35 minutes, and the cold mixing temperature is 20-25° C.

For the blending in the high-speed hot mixing device in step (3), the mixing time is 25-40 minutes, and the high-speed hot mixing temperature is 95-100° C.; the cold mixing time is 35 minutes, and the cold mixing temperature is 20-25° C.

For the blending in the high-speed hot mixing device in step (4), the high-speed hot mixing temperature is 123-127° C.; the cold mixing temperature is 20-23° C.

For the blending in the high-speed hot mixing device in step (5), the high-speed hot mixing temperature is 114-117° C.; the cold mixing temperature is 20-23° C.

The plasticizing and extruding in step (6) is that the core layer mixture is sucked into a hopper of a conical twin-screw extruder of a main machine via a vacuum feeder, and then melted and plasticized by the extruder into a distributor; at the same time, the skin layer material is loaded to a hopper of a conical twin-screw extruder of an auxiliary machine via a spring feeder, and then extruded, melted and plasticized into the distributor; after being merged by the distributor, the mixture enters a co-extrusion die through a confluence core and is extruded through the die mouth to obtain a molten material.

The parameters of the extrusion molding in step (6) are a main machine speed of 17-20 rpm/min, a main machine current of 65-70 A, a main machine screw barrel temperature of 177-181° C., an auxiliary machine speed of 12-14 rpm/min, an auxiliary machine current of 30-35 A, an auxiliary machine screw barrel temperature of 157-162° C., a confluence core temperature of 152-155° C., and a co-extrusion die head temperature of 177-182° C.

The temperature of the water-cooling shaping in step (7) is a normal water temperature.

The application of the wide low-temperature impact-resistant and bending-resistant PVC foam co-extruded sheet of the present disclosure is used in the field of new materials for building decoration, including the production of indoor and outdoor column cladding, cabinet and bath cabinet, paint-free furniture, pet boxes, etc.

Compared with the prior art, the present disclosure has the following beneficial effects:
(1) The wide low-temperature impact-resistant and bending-resistant PVC foam co-extruded sheet of the present disclosure has excellent transverse and longitudinal bending resistance in the upper skin layer and the lower skin layer, and does not break at −30° C.; the sheet has good toughness at low temperature, so that the strength and rigidity of the sheet can be effectively maintained, making it less likely to break under impact at low temperature; and the sheet is not easy to soften and deform at high temperature, and can be used in outdoor environments due to the good weather resistance.

(2) The wide low-temperature impact-resistant and bending-resistant PVC foam co-extruded sheet of the present disclosure is a flame retardant and smoke suppressant, which meets the requirements of fire rating standards for indoor building materials. In addition, the sheet also has excellent antibacterial and mildewproof properties and wear resistance.

(3) The preparation method for the wide low-temperature impact-resistant and bending-resistant PVC foam co-extruded sheet of the present disclosure is simple and easy to implement; the prepared PVC foam co-extruded sheet can have a width of up to 1560 mm, expanding the application field and scope.

DETAILED DESCRIPTION OF THE EMBODIMENTS

The present disclosure is further described below with reference to Examples.

Example 1

The wide low-temperature impact-resistant and bending-resistant PVC foam co-extruded sheet of this Example 1 comprises a core layer and a skin layer, the core layer comprising the following raw materials in parts by weight:

| | |
|---|---|
| PVC resin powder | 65 parts |
| silicon-acrylic composite low-temperature toughening and reinforcing agent | 4 parts |
| filler | 18 parts |
| foaming regulator I | 10 parts |
| white foaming agent | 2 parts |
| calcium-zinc stabilizer | 4 parts |
| cold-resistant plasticizer | 5 parts |
| stearic acid | 0.3 part |
| polyethylene wax | 0.7 part |
| oxidized polyethylene wax | 0.5 part; | and the skin layer comprising the following raw materials in parts by weight:

| | |
|---|---|
| PVC resin powder | 80 parts |
| silicon-acrylic composite low-temperature toughening and reinforcing agent | 8 parts |
| activated nano-silica | 2 parts |
| foaming regulator II | 4 parts |
| composite foaming agent | 0.8 part |
| calcium-zinc stabilizer | 4.5 parts |
| composite weather-resistant modifier | 4 parts |
| rutile titanium dioxide | 6 parts |
| polyethylene wax | 0.7 part |
| oxidized polyethylene wax | 0.5 part |
| cold-resistant plasticizer | 3 parts |
| compound antibacterial and mildewproof agent | 1.0 part. |

Among others,
the skin layer comprises an upper skin layer and a lower skin layer, and an upper surface and a lower surface of the core layer are connected to the upper skin layer and the lower skin layer, respectively; the upper skin layer and the lower skin layer have a same raw material composition and dosage relationship.

The PVC resin powder in the core layer and the PVC resin powder in the skin layer are suspension grade-8 (SG-8) type PVC resin powder.

silicone-methyl methacrylate-ethyl acrylate composite low-temperature toughening and reinforcing agents added in the core layer and the skin layer are terpolymers of silicone emulsion, ethyl acrylate and methyl methacrylate, which are modified and synthesized by chemical grafting and blending process.

The silicone-methyl methacrylate-ethyl acrylate composite low-temperature toughening and reinforcing agent comprises the following raw materials in percentage by mass: 70% of silicone emulsion, 15% of ethyl acrylate, and 15% of methyl methacrylate.

A method for preparing the silicone-methyl methacrylate-ethyl acrylate composite low-temperature toughening and reinforcing agent comprises the following steps:

(1) 70% by mass of water and sodium dodecyl benzene sulfonate were added to a reaction kettle, stirred and reacted at 55° C. for 1.5 h to obtain a first mixture;

(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;

(3) ethyl acrylate was evenly mixed with methyl methacrylate according to a mass ratio, and then benzoyl peroxide was added to dissolve the mixture and obtain a second mixture; and (4) the silicone emulsion prepared in step (2) and the second mixture prepared in step (3) were simultaneously dropped into n-butanol for 4 h, thereafter a pH of the solution was adjusted to 7; the mixture was then stirred and reacted for 4.5 h with the temperature maintained at 100° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The filler in the core layer is heavy calcium carbonate.

The foaming regulator I is a compound of Model 92 produced by Nikko Chemical, Model HL-801 produced by Nippon Chemical and Model HL-175 produced by Nippon Chemical in a mass ratio of 1.5:2:0.5.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η; and Model HL-175 produced by Nippon Chemical is synthesized with styrene and acrylonitrile, and has a viscosity of 1.83 η.

The white foaming agent in the core layer is sodium bicarbonate, which is Model w3835 produced by Shanghai Jieshangjie.

The calcium-zinc stabilizer in the core layer and the calcium-zinc stabilizer in the skin layer are the same, both being Bear R502.

The cold-resistant plasticizer in the core layer and the cold-resistant plasticizer in the skin layer are the same, both being diisooctyl adipate (DOA).

Stearic acid, polyethylene wax and oxidized polyethylene wax were added as a lubricant in the core layer.

Oxidized polyvinyl chloride wax is Model OS-25 produced by Weifang Kelan.

The foaming regulator II is a compound of Model 92 produced by Nikko Chemical and Model HL-801 produced by Nippon Chemical in a mass ratio of 2:1.3.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η.

The composite foaming agent in the skin layer is a mixture of a white foaming agent and an AC foaming agent in a mass ratio of 1.43:0.90; wherein the white foaming agent is sodium bicarbonate, which is Model w3835 produced by Shanghai Jieshangjie; the AC foaming agent is azodicarbonamide, which is ADC foaming agent produced by Ningxia Risheng.

The composite weather-resistant modifier in the skin layer is a mixture of an ultraviolet absorber and an antioxidant in a mass ratio of 1.5:2.5; wherein the ultraviolet absorber is 2-hydroxy-4-n-octoxybenzophenone, which is UV531 produced by Yantai Xinxiu Chemical. UV531 is light yellow needle crystal powder at room temperature and is a high-efficiency anti-aging additive with excellent performance. UV531 can strongly absorb 270-340 nm ultraviolet light and has characteristics such as light color, non-toxicity, good compatibility, small migration, and easy processing. The antioxidant is B215 produced by Tianjin Li'anlong, which is a binary compound series of phenolic antioxidants. B215 can be used at relatively high temperatures, has strong extraction resistance, and shows resistance to oxidative degradation during polymer processing.

The compound antibacterial and mildewproof agent in the skin layer is a compound of an infrared fluorescent agent and an inorganic silver ion antibacterial and mildewproof agent in a mass ratio of 0.0001:1; wherein the inorganic silver ion antibacterial and mildewproof agent is AEM5700-1 produced by Guangdong Jianis; the infrared fluorescent agent is the infrared green anti-counterfeiting powder produced by Qingdao Chongyu Technology Co. Ltd.

A method for preparing the wide low-temperature impact-resistant and bending-resistant PVC foam co-extruded sheet of this Example 1 comprises the following steps:
(1) the silicone-methyl methacrylate-ethyl acrylate composite low-temperature toughening and reinforcing agent was prepared;
(2) the PVC resin powder, the silicone-methyl methacrylate-ethyl acrylate composite low-temperature toughening and reinforcing agent, the activated nano-silica and the calcium-zinc stabilizer in the raw materials of the skin layer were placed into a high-speed hot mixing device according to a formula ratio for blending; the mixture was then placed into a high-speed cold mixing machine for cold mixing, and finally placed into a storage tank for standby within 36 hours;
(3) the PVC resin powder, the silicon-acrylic composite low-temperature toughening and reinforcing agent, the filler and the calcium-zinc stabilizer in the raw materials of the core layer were placed into a high-speed hot mixing device according to a formula ratio for blending; the mixture was then placed into a high-speed cold mixing machine for cold mixing, and finally placed into a storage tank for standby within 36 hours;
(4) other raw materials of the skin layer were added to the pretreated raw materials prepared in step (2) according to a raw materials ratio, and high-speed hot mixing and cold mixing were performed; after completion, the mixture was placed into a storage tank for standby;
(5) other raw materials of the core layer were added to the pretreated raw materials prepared in step (3) according to a raw material ratio, and high-speed hot mixing and cold mixing were performed; after completion, the mixture was placed into a storage tank for standby;
(6) the mixture was plasticized and extruded; and
(7) the extrudate was drawn and water-cooling shaped to obtain the wide low-temperature impact-resistant and bending-resistant PVC foam co-extruded sheet.

Among others,
a method for preparing the silicone-methyl methacrylate-ethyl acrylate composite low-temperature toughening and reinforcing agent in step (1) comprises the following steps:
(1) 70% by mass of water and sodium dodecyl benzene sulfonate were added to a reaction kettle, stirred and reacted at 55° C. for 1.5 h to obtain a first mixture;
(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;
(3) ethyl acrylate was evenly mixed with methyl methacrylate according to a mass ratio, and then benzoyl peroxide was added to dissolve the mixture and obtain a second mixture; and
(4) the silicone emulsion prepared in step (2) and the second mixture prepared in step (3) were simultaneously dropped into n-butanol for 4 h, thereafter a pH of the solution was adjusted to 7; the mixture was then stirred and reacted for 4.5 h with the temperature maintained at 100° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

For the blending in the high-speed hot mixing device in step (2), the mixing time is 35 minutes, and the high-speed hot mixing temperature is 100° C.; the cold mixing time is 35 minutes, and the cold mixing temperature is 22° C.

For the blending in the high-speed hot mixing device in step (3), the mixing time is 35 minutes, and the high-speed hot mixing temperature is 95° C.; the cold mixing time is 35 minutes, and the cold mixing temperature is 22° C.

For the blending in the high-speed hot mixing device in step (4), the high-speed hot mixing temperature is 125° C.; the cold mixing temperature is 20° C.

For the blending in the high-speed hot mixing device in step (5), the high-speed hot mixing temperature is 115° C.; the cold mixing temperature is 20° C.

The plasticizing and extruding in step (6) is that the core layer mixture was sucked into a hopper of a conical twin-screw extruder of a main machine via a vacuum feeder, and then melted and plasticized by the extruder into a distributor; at the same time, the skin layer material was loaded to a hopper of a conical twin-screw extruder of an auxiliary machine via a spring feeder, and then extruded, melted and plasticized into the distributor; after being merged by the distributor, the mixture entered a co-extrusion die through a confluence core and was extruded through the die mouth to obtain a molten material.

The parameters of the extrusion molding in step (6) are a main machine speed of 18 rpm/min, a main machine current of 66 A, a main machine screw barrel temperature of 179° C., an auxiliary machine speed of 13 rpm/min, an auxiliary machine current of 33 A, an auxiliary machine screw barrel temperature of 160° C., a confluence core temperature of 154° C., and a co-extrusion die head temperature of 180° C.

The temperature of the water-cooling shaping in step (7) is a normal water temperature.

Example 2

The wide low-temperature impact-resistant and bending-resistant PVC foam co-extruded sheet of this Example 2 comprises a core layer and a skin layer, the core layer comprising the following raw materials in parts by weight:

| | |
|---|---|
| PVC resin powder | 50 parts |
| silicon-acrylic composite low-temperature toughening and reinforcing agent | 3 parts |
| filler | 10 parts |
| foaming regulator I | 5 parts |
| white foaming agent | 1 part |
| calcium-zinc stabilizer | 3 parts |
| cold-resistant plasticizer | 3 parts |
| stearic acid | 0.1 part |
| polyethylene wax | 0.2 part |
| oxidized polyethylene wax | 0.8 part; | and the skin layer comprising the following raw materials in parts by weight:

| | |
|---|---|
| PVC resin powder | 60 parts |
| silicon-acrylic composite low-temperature toughening and reinforcing agent | 5 parts |
| activated nano-silica | 1 part |
| foaming regulator II | 2 parts |
| composite foaming agent | 0.3 part |
| calcium-zinc stabilizer | 4 parts |
| composite weather-resistant modifier | 2 parts |
| rutile titanium dioxide | 3 parts |
| polyethylene wax | 0.2 part |
| oxidized polyethylene wax | 0.8 part |
| cold-resistant plasticizer | 2 parts |
| compound antibacterial and mildewproof agent | 0.5 part. |

Among others,
the skin layer comprises an upper skin layer and a lower skin layer, and an upper surface and a lower surface of the core layer are connected to the upper skin layer and the lower skin layer, respectively; the upper skin layer and the lower skin layer have a same raw material composition and dosage relationship.

The PVC resin powder in the core layer and the PVC resin powder in the skin layer are suspension grade-8 (SG-8) type PVC resin powder.

Silicone-methyl methacrylate-ethyl acrylate composite low-temperature toughening and reinforcing agents added in the core layer and the skin layer are terpolymers of silicone emulsion, ethyl acrylate and methyl methacrylate, which are modified and synthesized by chemical grafting and blending process.

The silicone-methyl methacrylate-ethyl acrylate composite low-temperature toughening and reinforcing agent comprises the following raw materials in percentage by mass: 55% of silicone emulsion, 15% of ethyl acrylate, and 30% of methyl methacrylate.

A method for preparing the silicone-methyl methacrylate-ethyl acrylate composite low-temperature toughening and reinforcing agent comprises the following steps:
(1) 70% by mass of water and sodium dodecyl benzene sulfonate were added to a reaction kettle, stirred and reacted at 55° C. for 1.5 h to obtain a first mixture;
(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;
(3) ethyl acrylate was evenly mixed with methyl methacrylate according to a mass ratio, and then benzoyl peroxide was added to dissolve the mixture and obtain a second mixture; and
(4) the silicone emulsion prepared in step (2) and the second mixture prepared in step (3) were simultaneously dropped into n-butanol for 4 h, thereafter a pH of the solution was adjusted to 7; the mixture was then stirred and reacted for 5 h with the temperature maintained at 100° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The filler in the core layer is heavy calcium carbonate.

The foaming regulator I is a compound of Model 92 produced by Nikko Chemical, Model HL-801 produced by Nippon Chemical and Model HL-175 produced by Nippon Chemical in a mass ratio of 1.5:2:0.5.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η; and Model HL-175 produced by Nippon Chemical is synthesized with styrene and acrylonitrile, and has a viscosity of 1.83 η.

The white foaming agent in the core layer is sodium bicarbonate, which is Model w3835 produced by Shanghai Jieshangjie.

The calcium-zinc stabilizer in the core layer and the calcium-zinc stabilizer in the skin layer are the same, both being Bear R502.

The cold-resistant plasticizer in the core layer and the cold-resistant plasticizer in the skin layer are the same, both being diisooctyl adipate (DOA).

Stearic acid, polyethylene wax and oxidized polyethylene wax were added as a lubricant in the core layer.

Oxidized polyvinyl chloride wax is Model OS-25 produced by Weifang Kelan.

The foaming regulator II is a compound of Model 92 produced by Nikko Chemical and Model HL-801 produced by Nippon Chemical in a mass ratio of 2:1.3.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η.

The composite foaming agent in the skin layer is a mixture of a white foaming agent and an AC foaming agent in a mass ratio of 1.31:0.93; wherein the white foaming agent is sodium bicarbonate, which is Model w3835 produced by Shanghai Jieshangjie; the AC foaming agent is azodicarbonamide, which is ADC foaming agent produced by Ningxia Risheng.

The composite weather-resistant modifier in the skin layer is a mixture of an ultraviolet absorber and an antioxidant in a mass ratio of 1.5:2.5; wherein the ultraviolet absorber is 2-hydroxy-4-n-octoxybenzophenone, which is UV531 produced by Yantai Xinxiu Chemical. UV531 is light yellow needle crystal powder at room temperature and is a high-efficiency anti-aging additive with excellent performance. UV531 can strongly absorb 270-340 nm ultraviolet light and has characteristics such as light color, non-toxicity, good compatibility, small migration, and easy processing. The antioxidant is B215 produced by Tianjin Li'anlong, which is a binary compound series of phenolic antioxidants. B215 can be used at relatively high temperatures, has strong extraction resistance, and shows resistance to oxidative degradation during polymer processing.

The compound antibacterial and mildewproof agent in the skin layer is a compound of an infrared fluorescent agent and an inorganic silver ion antibacterial and mildewproof agent in a mass ratio of 0.0001:1; wherein the inorganic silver ion antibacterial and mildewproof agent is AEM5700-1 produced by Guangdong Jianis; the infrared fluorescent agent is the infrared green anti-counterfeiting powder produced by Qingdao Chongyu Technology Co. Ltd.

A method for preparing the wide low-temperature impact-resistant and bending-resistant PVC foam co-extruded sheet of this Example 2 comprises the following steps:
(1) the silicone-methyl methacrylate-ethyl acrylate composite low-temperature toughening and reinforcing agent was prepared;
(2) the PVC resin powder, the silicone-methyl methacrylate-ethyl acrylate composite low-temperature toughening and reinforcing agent, the activated nano-silica and the calcium-zinc stabilizer in the raw materials of the skin layer were placed into a high-speed hot mixing device according to a formula ratio for blending; the mixture was then placed into a high-speed cold mixing machine for cold mixing, and finally placed into a storage tank for standby within 24 hours;
(3) the PVC resin powder, the silicone-methyl methacrylate-ethyl acrylate composite low-temperature toughening and reinforcing agent, the filler and the calcium-zinc stabilizer in the raw materials of the core layer were placed into a high-speed hot mixing device according to a formula ratio for blending; the mixture was then placed into a high-speed cold mixing machine for cold mixing, and finally placed into a storage tank for standby within 24 hours;
(4) other raw materials of the skin layer were added to the pretreated raw materials prepared in step (2) according to a raw materials ratio, and high-speed hot mixing and cold mixing were performed; after completion, the mixture was placed into a storage tank for standby;
(5) other raw materials of the core layer were added to the pretreated raw materials prepared in step (3) according to a raw material ratio, and high-speed hot mixing and cold mixing were performed; after completion, the mixture was placed into a storage tank for standby;
(6) the mixture was plasticized and extruded; and
(7) the extrudate was drawn and water-cooling shaped to obtain the wide low-temperature impact-resistant and bending-resistant PVC foam co-extruded sheet.

Among others,
a method for preparing the silicon-acrylic composite low-temperature toughening and reinforcing agent in step (1) comprises the following steps:
(1) 70% by mass of water and sodium dodecyl benzene sulfonate were added to a reaction kettle, stirred and reacted at 55° C. for 1.5 h to obtain a first mixture;
(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;
(3) ethyl acrylate was evenly mixed with methyl methacrylate according to a mass ratio, and then benzoyl peroxide was added to dissolve the mixture and obtain a second mixture; and
(4) the silicone emulsion prepared in step (2) and the second mixture prepared in step (3) were simultaneously dropped into n-butanol for 4 h, thereafter a pH of the solution was adjusted to 7; the mixture was then stirred and reacted for 5 h with the temperature maintained at 100° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The silicone-methyl methacrylate-ethyl acrylate composite low-temperature toughening and reinforcing agent comprises the following raw materials in percentage by mass: 55% of silicone emulsion, 15% of ethyl acrylate, and 30% of methyl methacrylate.

For the blending in the high-speed hot mixing device in step (2), the mixing time is 25 minutes, and the high-speed hot mixing temperature is 103° C.; the cold mixing time is 35 minutes, and the cold mixing temperature is 20° C.

For the blending in the high-speed hot mixing device in step (3), the mixing time is 25 minutes, and the high-speed hot mixing temperature is 98° C.; the cold mixing time is 35 minutes, and the cold mixing temperature is 20° C.

For the blending in the high-speed hot mixing device in step (4), the high-speed hot mixing temperature is 123° C.; the cold mixing temperature is 21° C.

For the blending in the high-speed hot mixing device in step (5), the high-speed hot mixing temperature is 114° C.; the cold mixing temperature is 22° C.

The plasticizing and extruding in step (6) is that the core layer mixture was sucked into a hopper of a conical twin-screw extruder of a main machine via a vacuum feeder, and then melted and plasticized by the extruder into a distributor; at the same time, the skin layer material was loaded to a hopper of a conical twin-screw extruder of an auxiliary machine via a spring feeder, and then extruded, melted and plasticized into the distributor; after being merged by the distributor, the mixture entered a co-extrusion die through a confluence core and was extruded through the die mouth to obtain a molten material.

The parameters of the extrusion molding in step (6) are a main machine speed of 17 rpm/min, a main machine current of 65 A, a main machine screw barrel temperature of 177° C., an auxiliary machine speed of 12 rpm/min, an auxiliary machine current of 30 A, an auxiliary machine screw barrel temperature of 157° C., a confluence core temperature of 152° C., and a co-extrusion die head temperature of 182° C.

The temperature of the water-cooling shaping in step (7) is a normal water temperature.

Example 3

The wide low-temperature impact-resistant and bending-resistant PVC foam co-extruded sheet of this Example 3 comprises a core layer and a skin layer, the core layer comprising the following raw materials in parts by weight:

| | |
|---|---|
| PVC resin powder | 80 parts |
| silicon-acrylic composite low-temperature toughening and reinforcing agent | 6 parts |
| filler | 25 parts |
| foaming regulator I | 15 parts |
| white foaming agent | 4 parts |
| calcium-zinc stabilizer | 6 parts |
| cold-resistant plasticizer | 6 parts |
| stearic acid | 0.5 part |
| polyethylene wax | 1.1 parts |
| oxidized polyethylene wax | 0.8 part; | and the skin layer comprising the following raw materials in parts by weight:

| | |
|---|---|
| PVC resin powder | 100 parts |
| silicon-acrylic composite low-temperature toughening and reinforcing agent | 9 parts |
| activated nano-silica | 3 parts |
| foaming regulator II | 5 parts |
| composite foaming agent | 1.2 parts |
| calcium-zinc stabilizer | 5 parts |
| composite weather-resistant modifier | 5 parts |
| rutile titanium dioxide | 8 parts |
| polyethylene wax | 1.1 parts |
| oxidized polyethylene wax | 0.5 part |
| cold-resistant plasticizer | 4 parts |
| compound antibacterial and mildewproof agent | 1.5 parts. |

Among others,
the skin layer comprises an upper skin layer and a lower skin layer, and an upper surface and a lower surface of the core layer are connected to the upper skin layer and the lower skin layer, respectively; the upper skin layer and the lower skin layer have a same raw material composition and dosage relationship.

The PVC resin powder in the core layer and the PVC resin powder in the skin layer are suspension grade-8 (SG-8) type PVC resin powder.

Silicone-methyl methacrylate-ethyl acrylate composite low-temperature toughening and reinforcing agents added in the core layer and the skin layer are terpolymers of silicone emulsion, ethyl acrylate and methyl methacrylate, which are modified and synthesized by chemical grafting and blending process.

The silicone-methyl methacrylate-ethyl acrylate composite low-temperature toughening and reinforcing agent comprises the following raw materials in percentage by mass: 85% of silicone emulsion, 5% of ethyl acrylate, and 10% of methyl methacrylate.

A method for preparing the silicone-methyl methacrylate-ethyl acrylate composite low-temperature toughening and reinforcing agent comprises the following steps:

(1) 70% by mass of water and sodium dodecyl benzene sulfonate were added to a reaction kettle, stirred and reacted at 55° C. for 1.5 h to obtain a first mixture;

(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;

(3) ethyl acrylate was evenly mixed with methyl methacrylate according to a mass ratio, and then benzoyl peroxide was added to dissolve the mixture and obtain a second mixture; and (4) the silicone emulsion prepared in step (2) and the second mixture prepared in step (3) were simultaneously dropped into n-butanol for 4 h, thereafter a pH of the solution was adjusted to 7; the mixture was then stirred and reacted for 5 h with the temperature maintained at 105° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The filler in the core layer is heavy calcium carbonate.

The foaming regulator I is a compound of Model 92 produced by Nikko Chemical, Model HL-801 produced by Nippon Chemical and Model HL-175 produced by Nippon Chemical in a mass ratio of 1.5:2:0.5.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η; and Model HL-175 produced by Nippon Chemical is synthesized with styrene and acrylonitrile, and has a viscosity of 1.83 η.

The white foaming agent in the core layer is sodium bicarbonate, which is Model w3835 produced by Shanghai Jieshangjie.

The calcium-zinc stabilizer in the core layer and the calcium-zinc stabilizer in the skin layer are the same, both being Bear R502.

The cold-resistant plasticizer in the core layer and the cold-resistant plasticizer in the skin layer are the same, both being diisooctyl adipate (DOA).

Stearic acid, polyethylene wax and oxidized polyethylene wax were added as a lubricant in the core layer.

Oxidized polyvinyl chloride wax is Model OS-25 produced by Weifang Kelan.

The foaming regulator II is a compound of Model 92 produced by Nikko Chemical and Model HL-801 produced by Nippon Chemical in a mass ratio of 2:1.3.

Model 92 produced by Nikko Chemical is synthesized with high viscosity methyl methacrylate and butyl methacrylate, and has a viscosity of 15.14 η; Model HL-801 produced by Nikko Chemical is synthesized with styrene and acrylonitrile, and has a viscosity of 12.09 η.

The composite foaming agent in the skin layer is a mixture of a white foaming agent and an AC foaming agent in a mass ratio of 1.52:0.85; wherein the white foaming agent is sodium bicarbonate, which is Model w3835 produced by Shanghai Jieshangjie; the AC foaming agent is azodicarbonamide, which is ADC foaming agent produced by Ningxia Risheng.

The composite weather-resistant modifier in the skin layer is a mixture of an ultraviolet absorber and an antioxidant in a mass ratio of 1.5:2.5; wherein the ultraviolet absorber is 2-hydroxy-4-n-octoxybenzophenone, which is UV531 produced by Yantai Xinxiu Chemical. UV531 is light yellow needle crystal powder at room temperature and is a high-efficiency anti-aging additive with excellent performance. UV531 can strongly absorb 270-340 nm ultraviolet light and has characteristics such as light color, non-toxicity, good compatibility, small migration, and easy processing. The antioxidant is B215 produced by Tianjin Li'anlong, which is a binary compound series of phenolic antioxidants. B215 can be used at relatively high temperatures, has strong extraction resistance, and shows resistance to oxidative degradation during polymer processing.

The compound antibacterial and mildewproof agent in the skin layer is a compound of an infrared fluorescent agent and an inorganic silver ion antibacterial and mildewproof agent in amass ratio of 0.0001:1; wherein the inorganic silver ion antibacterial and mildewproof agent is AEM5700-1 produced by Guangdong Jianis; the infrared fluorescent agent is the infrared green anti-counterfeiting powder produced by Qingdao Chongyu Technology Co. Ltd.

A method for preparing the wide low-temperature impact-resistant and bending-resistant PVC foam co-extruded sheet of this Example 3 comprises the following steps:
(1) the silicone-methyl methacrylate-ethyl acrylate composite low-temperature toughening and reinforcing agent was prepared;
(2) the PVC resin powder, the silicone-methyl methacrylate-ethyl acrylate composite low-temperature toughening and reinforcing agent, the activated nano-silica and the calcium-zinc stabilizer in the raw materials of the skin layer were placed into a high-speed hot mixing device according to a formula ratio for blending; the mixture was then placed into a high-speed cold mixing machine for cold mixing, and finally placed into a storage tank for standby within 48 hours;
(3) the PVC resin powder, the silicone-methyl methacrylate-ethyl acrylate composite low-temperature toughening and reinforcing agent, the filler and the calcium-zinc stabilizer in the raw materials of the core layer were placed into a high-speed hot mixing device according to a formula ratio for blending; the mixture was then placed into a high-speed cold mixing machine for cold mixing, and finally placed into a storage tank for standby within 48 hours;
(4) other raw materials of the skin layer were added to the pretreated raw materials prepared in step (2) according to a raw materials ratio, and high-speed hot mixing and cold mixing were performed; after completion, the mixture was placed into a storage tank for standby;
(5) other raw materials of the core layer were added to the pretreated raw materials prepared in step (3) according to a raw material ratio, and high-speed hot mixing and cold mixing were performed; after completion, the mixture was placed into a storage tank for standby;
(6) the mixture was plasticized and extruded; and
(7) the extrudate was drawn and water-cooling shaped to obtain the wide low-temperature impact-resistant and bending-resistant PVC foam co-extruded sheet.

Among others,
a method for preparing the silicone-methyl methacrylate-ethyl acrylate composite low-temperature toughening and reinforcing agent in step (1) comprises the following steps:
(1) 70% by mass of water and sodium dodecyl benzene sulfonate were added to a reaction kettle, stirred and reacted at 55° C. for 1.5 h to obtain a first mixture;
(2) methyl triethoxysilane and the remaining water were added to a reaction kettle for stirring, with a stirring speed of 500 r/min; the system was then warmed to 60° C., and the stirring speed was adjusted to 3000 r/min; the mixture prepared in step (1) was added, and the system continued to react for 5 h after the completion of the dropwise addition to obtain the silicone emulsion;
(3) ethyl acrylate was evenly mixed with methyl methacrylate according to a mass ratio, and then benzoyl peroxide was added to dissolve the mixture and obtain a second mixture; and
(4) the silicone emulsion prepared in step (2) and the second mixture prepared in step (3) were simultaneously dropped into n-butanol for 4 h, thereafter a pH of the solution was adjusted to 7; the mixture was then stirred and reacted for 5 h with the temperature maintained at 105° C. to form a salt by neutralization, dried and pelletized to obtain the silicone-methyl methacrylate-ethyl acrylate composite low-temperature toughening and reinforcing agent.

In the preparation of the silicone emulsion, sodium dodecyl benzene sulfonate accounts for 5% by mass, methyl triethoxysilane accounts for 60% by mass, and the balance is water.

The silicone-methyl methacrylate-ethyl acrylate composite low-temperature toughening and reinforcing agent comprises the following raw materials in percentage by mass: 85% of silicone emulsion, 5% of ethyl acrylate, and 10% of methyl methacrylate.

For the blending in the high-speed hot mixing device in step (2), the mixing time is 40 minutes, and the high-speed hot mixing temperature is 105° C.; the cold mixing time is 35 minutes, and the cold mixing temperature is 25° C.

For the blending in the high-speed hot mixing device in step (3), the mixing time is 40 minutes, and the high-speed hot mixing temperature is 100° C.; the cold mixing time is 35 minutes, and the cold mixing temperature is 25° C.

For the blending in the high-speed hot mixing device in step (4), the high-speed hot mixing temperature is 127° C.; the cold mixing temperature is 23° C.

For the blending in the high-speed hot mixing device in step (5), the high-speed hot mixing temperature is 117° C.; the cold mixing temperature is 23° C.

The plasticizing and extruding in step (6) is that the core layer mixture was sucked into a hopper of a conical twin-screw extruder of a main machine via a vacuum feeder, and then melted and plasticized by the extruder into a distributor; at the same time, the skin layer material was loaded to a hopper of a conical twin-screw extruder of an auxiliary machine via a spring feeder, and then extruded, melted and plasticized into the distributor; after being merged by the distributor, the mixture entered a co-extrusion die through a confluence core and was extruded through the die mouth to obtain a molten material.

The parameters of the extrusion molding in step (6) are a main machine speed of 20 rpm/min, a main machine current of 70 A, a main machine screw barrel temperature of 181° C., an auxiliary machine speed of 14 rpm/min, an auxiliary machine current of 35 A, an auxiliary machine screw barrel temperature of 162° C., a confluence core temperature of 155° C., and a co-extrusion die head temperature of 182° C.

The temperature of the water-cooling shaping in step (7) is a normal water temperature.

Comparative Example 1

The PVC foam co-extruded sheet of this Comparative Example 1 comprises a core layer and a skin layer. The PVC foam co-extruded sheet is prepared in the same manner as in Example 3. The composition and the dosage relationship of the raw materials of the skin layer are the same as in Example 3, except that the raw materials composition of the core layer is different. The raw materials composition of the core layer in Comparative Example 1 is as follows:

the core layer comprises the following raw materials in parts by weight:

| | |
|---|---|
| PVC resin powder | 80 parts |
| filler | 25 parts |
| foaming regulator I | 15 parts |
| white foaming agent | 4 parts |
| calcium-zinc stabilizer | 6 parts |
| cold-resistant plasticizer | 6 parts |
| stearic acid | 0.5 part |
| polyethylene wax | 1.1 parts |
| oxidized polyethylene wax | 0.8 part; | wherein the filler, the foaming regulator I, the white foaming agent, the calcium-zinc stabilizer and the cold-resistant plasticizer in the core layer are the same as in Example 3.

Comparative Example 2

The PVC foam co-extruded sheet of this Comparative Example 2 comprises a core layer and a skin layer. The PVC foam co-extruded sheet is prepared in the same manner as in Example 3. The composition and the dosage relationship of the raw materials of the core layer are the same as in Example 3, except that the raw materials composition of the skin layer is different. The raw materials composition of the skin layer in Comparative Example 2 is as follows:

the skin layer comprises the following raw materials in parts by weight:

| | |
|---|---|
| PVC resin powder | 100 parts |
| activated nano-silica | 3 parts |
| foaming regulator II | 5 parts |
| composite foaming agent | 1.2 parts |
| calcium-zinc stabilizer | 5 parts |
| composite weather-resistant modifier | 5 parts |
| rutile titanium dioxide | 8 parts |
| polyethylene wax | 1.1 parts |
| oxidized polyethylene wax | 0.5 part |
| cold-resistant plasticizer | 4 parts |
| compound antibacterial and mildewproof agent | 1.5 parts; | wherein the foaming regulator II, the composite foaming agent, the calcium-zinc stabilizer, the composite weather-resistant modifier, the cold-resistant plasticizer and the compound antibacterial and mildewproof agent in the skin layer are the same as in Example 3.

Comparative Example 3

The PVC foam co-extruded sheet of this Comparative Example 3 comprises a core layer and a skin layer. The PVC foam co-extruded sheet is prepared in the same manner as in Example 3. The raw materials compositions of the core layer and the skin layer are different from those of Example 3. The raw materials compositions of the core layer and the skin layer are as follows:

the core layer comprises the following raw materials in parts by weight:

| | |
|---|---|
| PVC resin powder | 80 parts |
| filler | 25 parts |
| foaming regulator I | 15 parts |
| white foaming agent | 4 parts |
| calcium-zinc stabilizer | 6 parts |
| stearic acid | 0.5 part |
| polyethylene wax | 1.1 parts |
| oxidized polyethylene wax | 0.8 part; | wherein the filler, the foaming regulator I, the white foaming agent and the calcium-zinc stabilizer in the core layer are the same as in Example 3; and the skin layer comprises the following raw materials in parts by weight:

| | |
|---|---|
| PVC resin powder | 100 parts |
| foaming regulator II | 5 parts |
| composite foaming agent | 1.2 parts |
| calcium-zinc stabilizer | 5 parts |
| rutile titanium dioxide | 8 parts |
| polyethylene wax | 1.1 parts |
| oxidized polyethylene wax | 0.5 part |
| compound antibacterial and mildewproof agent | 1.5 parts; | wherein the foaming regulator II, the composite foaming agent, the calcium-zinc stabilizer and the compound antibacterial and mildewproof agent in the skin layer are the same as in Example 3.

Performance tests were performed on the PVC foam sheets prepared in Examples 1-3 and Comparative Examples 1-3, and the results are shown in Table 1 below:

TABLE 1

Test results of foam sheets prepared in Examples 1-3 and Comparative Examples 1-2

| Performance indexes and units | Example 1 | Example 2 | Example 3 | Comparative Example 1 | Comparative Example 2 | Comparative Example 3 |
|---|---|---|---|---|---|---|
| Apparent density/(Kg/m$^3$) | 0.68 | 0.68 | 0.68 | 0.68 | 0.68 | 0.68 |
| 23° C. Bending resistance times/time Longitudinal | 496 | 477 | 482 | 432 | 95 | 35 |
| Transverse | 372 | 352 | 368 | 334 | 42 | 14 |
| −30° C. Bending resistance times/time Longitudinal | 311 | 280 | 298 | 268 | 24 | 8 |
| Transverse | 203 | 183 | 192 | 162 | 15 | 2 |
| Tensile strength/MPa | 31.2 | 28.3 | 35.2 | 17.5 | 21.8 | 15.4 |
| Tensile strain/% | 32.1 | 28.3 | 33.1 | 16.8 | 18.7 | 12.5 |
| Bending strength/Mpa | 35.4 | 33.2 | 37.8 | 22.8 | 26.7 | 20.3 |
| Bending elastic modulus/Mpa | 2780 | 2532 | 2855 | 1380 | 1550 | 1150 |

TABLE 1-continued

Test results of foam sheets prepared in Examples 1-3 and Comparative Examples 1-2

| Performance indexes and units | Example 1 | Example 2 | Example 3 | Comparative Example 1 | Comparative Example 2 | Comparative Example 3 |
|---|---|---|---|---|---|---|
| Charpy impact strength/KJ/m$^2$ | 41.6 | 37.5 | 42.8 | 19.5 | 20.4 | 15.8 |
| 2000 h QUV aging ΔE | 1.33 | 1.21 | 1.03 | 1.55 | 8.86 | 9.32 |

What is claimed is:

1. A wide low-temperature impact-resistant and bending-resistant polyvinyl chloride (PVC) foam co-extruded sheet, comprising a core layer and a skin layer, the core layer comprising following raw materials in parts by weight:
   a PVC resin powder: 50-80 parts;
   a silicone-methyl methacrylate-ethyl acrylate composite low-temperature toughening and reinforcing agent: 3-6 parts;
   a filler: 10-25 parts;
   a foaming regulator I: 5-15 parts;
   a white foaming agent: 1-4 parts;
   a calcium-zinc stabilizer: 3-6 parts;
   a cold-resistant plasticizer: 3-6 parts;
   stearic acid 0.1-0.5 parts;
   a polyethylene wax: 0.2-1.1 parts; and
   an oxidized polyethylene wax: 0.2-0.8 parts; and
   the skin layer comprising the following raw materials in parts by weight:
   the PVC resin powder: 60-100 parts;
   the silicone-methyl methacrylate-ethyl acrylate composite low-temperature toughening and reinforcing agent: 5-9 parts;
   an activated nano-silica: 1-3 parts;
   a foaming regulator II: 2-5 parts;
   a composite foaming agent: 0.3-1.2 parts;
   the calcium-zinc stabilizer: 4-5 parts;
   a composite weather-resistant modifier: 2-5 parts;
   rutile titanium dioxide: 3-8 parts;
   the polyethylene wax: 0.2-1.1 parts;
   the oxidized polyethylene wax: 0.2-0.5 parts;
   the cold-resistant plasticizer: 2-4 parts; and
   a compound antibacterial and mildewproof agent: 0.5-1.5 parts,
   wherein
   the silicone-methyl methacrylate-ethyl acrylate composite low-temperature toughening and reinforcing agent comprises the following raw materials in percentage by mass: 55-85% of silicone emulsion, 5-15% of ethyl acrylate, and 10-30% of methyl methacrylate;
   a method for preparing the silicone-methyl methacrylate-ethyl acrylate composite low-temperature toughening and reinforcing agent comprises following steps:
   (1) adding 70% by mass of water and sodium dodecyl benzene sulfonate to a reaction kettle, stirring and reacting at 55° C. for 1.5 h to obtain a first mixture;
   (2) adding methyl triethoxysilane and the remaining water to a reaction kettle for stirring, with a stirring speed of 500 r/min; and then warming to 60° C. and adjusting the stirring speed to 3000 r/min, adding the first mixture, and continuing a reaction for 5 h after completion of a dropwise addition to obtain the silicone emulsion;
   (3) mixing ethyl acrylate and methyl methacrylate evenly according to a mass ratio, and then adding benzoyl peroxide to dissolve a mixture of ethyl acrylate and methyl methacrylate and obtain a second mixture; and
   (4) simultaneously dropping the silicone emulsion and the second mixture into n-butanol for 4 h, thereafter adjusting a pH of a solution to 7, then stirring and reacting for 4.5-5 h at a temperature maintained between 100-105° C. to form a salt by neutralization, drying and pelletizing to obtain the silicone-methyl methacrylate-ethyl acrylate composite low-temperature toughening and reinforcing agent,
   wherein in the preparation of the silicone emulsion, sodium dodecyl benzenesulfonate accounts for 5% by mass, methyl triethoxysilane accounts for 60% by mass, and the balance is water, wherein the PVC foam co-extruded sheet comprises a width of up to 1560 millimetre (mm).

2. The wide low-temperature impact-resistant and bending-resistant PVC foam co-extruded sheet of claim 1, wherein the skin layer comprises an upper skin layer and a lower skin layer, and an upper surface and a lower surface of the core layer are connected to the upper skin layer and the lower skin layer, respectively; the upper skin layer and the lower skin layer have a same raw material composition and dosage relationship; the PVC resin powder in the core layer and the PVC resin powder in the skin layer are suspension grade-8 (SG-8) type PVC resin powder.

3. The wide low-temperature impact-resistant and bending-resistant PVC foam co-extruded sheet of claim 1, wherein the filler in the core layer is heavy calcium carbonate; and the white foaming agent in the core layer is sodium bicarbonate.

4. The wide low-temperature impact-resistant and bending-resistant PVC foam co-extruded sheet of claim 1, wherein the calcium-zinc stabilizer in the core layer and the calcium-zinc stabilizer in the skin layer are the same; and the cold-resistant plasticizer in the core layer and the cold-resistant plasticizer in the skin layer are same, both being diisooctyl adipate.

5. The wide low-temperature impact-resistant and bending-resistant PVC foam co-extruded sheet of claim 1, wherein the composite foaming agent in the skin layer is a mixture of a white foaming agent and an azodicarbonamide (AC) foaming agent in a mass ratio of (1.31-1.52):(0.85-0.93).

6. The wide low-temperature impact-resistant and bending-resistant PVC foam co-extruded sheet of claim 1, wherein the composite weather-resistant modifier in the skin layer is a mixture of an ultraviolet absorber and an antioxidant in a mass ratio of 1.5:2.5; wherein the ultraviolet absorber is 2-hydroxy-4-n-octoxybenzophenone; and
   the compound antibacterial and mildewproof agent in the skin layer is a compound of an infrared fluorescent agent and an inorganic silver ion antibacterial and mildewproof agent in a mass ratio of 0.0001:1.

* * * * *